(12) United States Patent
Anilovich et al.

(10) Patent No.: US 10,100,695 B2
(45) Date of Patent: Oct. 16, 2018

(54) EXHAUST FLUID DOSING CONTROL SYSTEM AND METHOD

(71) Applicant: GM GLOBAL TECHNOLOGY OPERATIONS LLC, Detroit, MI (US)

(72) Inventors: Igor Anilovich, Walled Lake, MI (US); Jeffrey F. Loo, Bellevue, MI (US); Janean E. Kowalkowski, Northville, MI (US); Justin Adam Shetney, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1042 days.

(21) Appl. No.: 13/959,250

(22) Filed: Aug. 5, 2013

(65) Prior Publication Data
US 2015/0033705 A1 Feb. 5, 2015

(51) Int. Cl.
*F01N 3/20* (2006.01)
*F01N 11/00* (2006.01)

(52) U.S. Cl.
CPC ............. *F01N 3/208* (2013.01); *F01N 11/00* (2013.01); *F01N 2550/02* (2013.01); *F01N 2560/026* (2013.01); *F01N 2560/14* (2013.01); *F01N 2610/02* (2013.01); *F01N 2900/0412* (2013.01); *F01N 2900/1621* (2013.01); *Y02A 50/2325* (2018.01); *Y02T 10/24* (2013.01); *Y02T 10/47* (2013.01)

(58) Field of Classification Search
CPC ............. F01N 3/208; F01N 2560/026; F01N 2560/14; F01N 2900/1621; F01N 2550/20
See application file for complete search history.

(56) References Cited

U.S. PATENT DOCUMENTS

| | | | |
|---|---|---|---|
| 2010/0031639 A1* | 2/2010 | Kwon | F01N 3/208 60/286 |
| 2010/0281855 A1* | 11/2010 | Sun | F01N 3/208 60/286 |
| 2011/0162350 A1* | 7/2011 | Ponnathpur | 60/274 |
| 2012/0006004 A1* | 1/2012 | Tai et al. | 60/274 |

* cited by examiner

*Primary Examiner* — Brandon Lee
(74) *Attorney, Agent, or Firm* — Cantor Colburn LLP

(57) ABSTRACT

A dosing control system for an exhaust system of an engine includes: a tank containing a reductant solution having urea; an injector operable to inject the reductant solution into an exhaust flow upstream of an SCR apparatus; first and second NOx sensors disposed to sense NOx emissions in the exhaust flow upstream and downstream, respectively, of the SCR apparatus; and a control module. The control module is disposed in signal communication with the first and second NOx sensors and in operable communication with the injector, the control module being operable to set an original dosing level and decrease a dosing of the reductant solution injected by the injector based on a determination from signals received from the first and second NOx sensors that a reduction in a conversion efficiency of the SCR apparatus below a defined level of conversion efficiency has occurred.

14 Claims, 2 Drawing Sheets

EXHAUST FLUID DOSING CONTROL SYSTEM AND METHOD

FIELD OF THE INVENTION

The subject invention relates to internal combustion engines, particularly to the use of exhaust fluid reductant for reducing nitrogen oxides (NOx) emissions in the exhaust of such engines, and more particularly to the control of the dosing rate of reductant solution to compensate for an aging catalyst in a selective catalytic reduction (SCR) apparatus used in such exhaust systems.

BACKGROUND

An example reductant is an aqueous urea solution optimally blended with 32.5% urea and 67.5% deionized water, and is used in exhaust systems equipped with an SCR apparatus to lower NOx exhaust emissions. In an SCR apparatus, the urea is converted into ammonia, which is stored in the ceramic walls of the catalyst of the SCR apparatus. The purpose of the urea injection into the SCR apparatus is to control the ammonia storage to assist with NOx conversion. Due to the exposure in the exhaust gas pipe of the engine by high temperature, lubricating oil burned during combustion, sulfur from the certain fuels, and unburned hydrocarbons that are absorbed by the catalyst of the SCR apparatus, there is an irreversible natural aging of the catalyst. If the catalyst of the SCR apparatus ages to a degree of having reduced ammonia storage capacity, the tailpipe NOx emissions will increase and ammonia slip will occur. The more the SCR apparatus is degraded, the greater the amount of ammonia slip. Accordingly, the art of controlling NOx emissions, and ammonia slip, in the exhaust of internal combustion engines will be improved by providing a control system that can adjust the dosing of the reductant as the catalyst of the SCR apparatus ages.

SUMMARY OF THE INVENTION

In an exemplary embodiment of the invention, a dosing control system for an exhaust system is provided, where the exhaust system has an exhaust flow port configured and disposed to receive exhaust flow from an internal combustion engine, and a selective catalytic reduction (SCR) apparatus disposed in downstream flow communication with the exhaust flow port. The dosing control system includes: a reductant tank operable to contain a reductant solution comprising urea; an injector disposed in operable communication between the reductant tank and the SCR apparatus, and being operable to inject the reductant solution into an exhaust flow upstream of the SCR apparatus; a first NOx sensor disposed to sense NOx emissions in the exhaust flow upstream of the SCR apparatus; a second NOx sensor disposed to sense NOx emissions in the exhaust flow downstream of the SCR apparatus; and a control module. The control module is disposed in signal communication with the first and second NOx sensors and in operable communication with the injector, the control module being operable to set an original dosing level and decrease a dosing of the reductant solution injected by the injector based on a determination from signals received from the first and second NOx sensors that a reduction in a conversion efficiency of the SCR apparatus below a defined level of conversion efficiency has occurred.

In another exemplary embodiment of the invention, a method for delivering an exhaust fluid reductant solution to an exhaust flow upstream of a selective catalytic reduction (SCR) apparatus disposed in flow communication with an internal combustion engine is provided. The method includes: determining a NOx conversion efficiency of the SCR apparatus; based on the NOx conversion efficiency being determined to have decreased below a defined level of conversion efficiency, decreasing by a defined amount the dosing of the reductant solution to be injected into the exhaust flow upstream of the SCR apparatus; and injecting the decreased dosing of the reductant solution into the exhaust flow upstream of the SCR apparatus.

In another exemplary embodiment of the invention, a vehicle has an internal combustion engine, an exhaust system having an exhaust flow port configured and disposed to receive exhaust flow from the engine, a selective catalytic reduction (SCR) apparatus disposed in downstream flow communication with the exhaust flow port, and a dosing control system. The dosing control system includes: a reductant tank operable to contain a reductant solution comprising urea; an injector disposed in operable communication between the reductant tank and the SCR apparatus, and being operable to inject the reductant solution into an exhaust flow upstream of the SCR apparatus; a first NOx sensor disposed to sense NOx emissions in the exhaust flow upstream of the SCR apparatus; a second NOx sensor disposed to sense NOx emissions in the exhaust flow downstream of the SCR apparatus; and a control module disposed in signal communication with the first and second NOx sensors and in operable communication with the injector, the control module being operable to decrease a dosing of the reductant solution injected by the injector based on a determination from signals received from the first and second NOx sensors that a reduction in a conversion efficiency of the SCR apparatus below a defined level of conversion efficiency has occurred.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
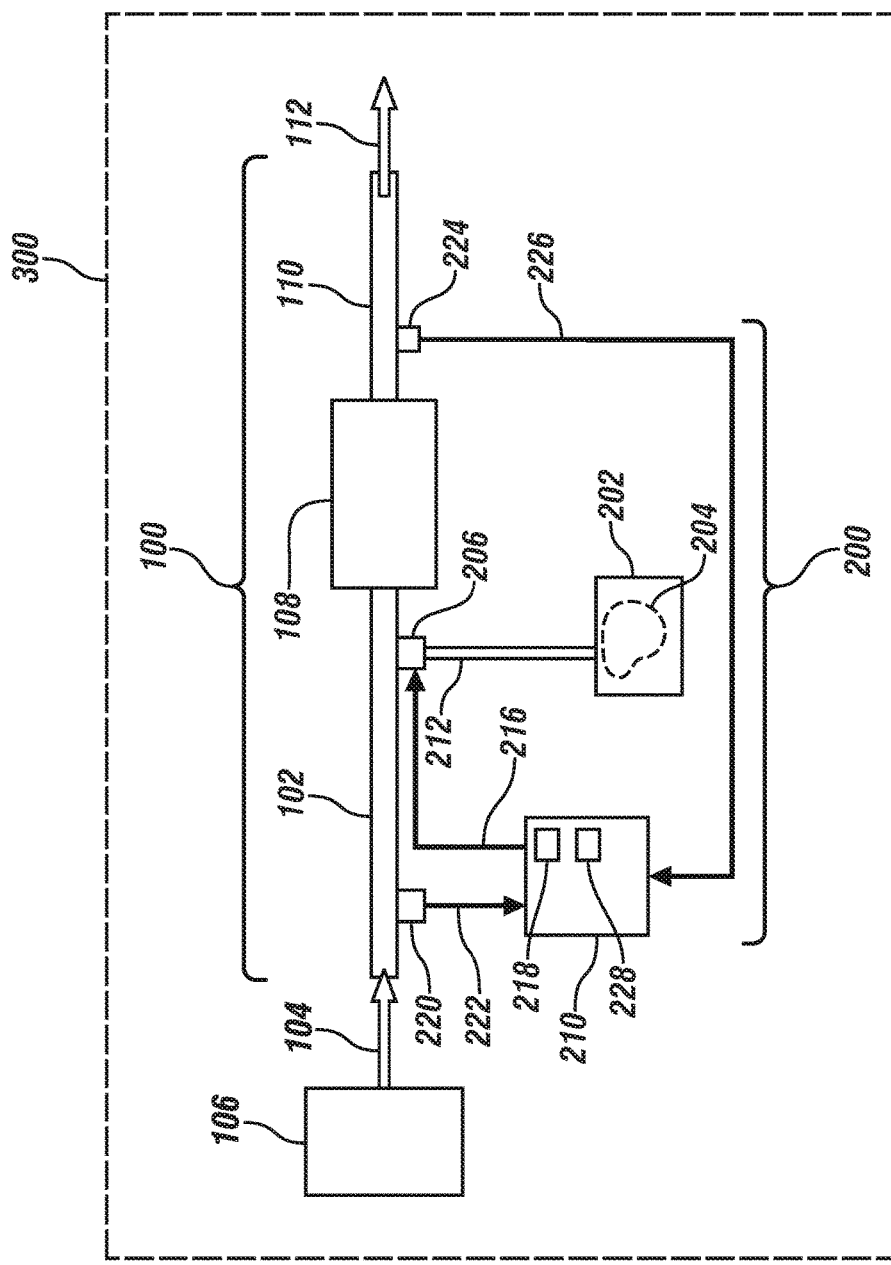
FIG. 1 depicts a block diagram schematic of an exhaust fluid dosing control system in accordance with an embodiment of the invention.

The following description is merely exemplary in nature and is not intended to limit the present disclosure, its application or uses. It should be understood that throughout the drawings, corresponding reference numerals indicate like or corresponding parts and features.

As used herein, the term vehicle is not limited to just an automobile, truck, van or sport utility vehicle, but includes any self-propelled or towed conveyance suitable for transporting a burden, or any stationary or non-road engine equipment.

In an embodiment, the term "engine" as used herein refers to any internal combustion engine capable of producing oxides of nitrogen. In an embodiment, the term "engine" refers to a diesel engine. In another embodiment, the term "engine" refers to a spark-ignition engine fueled by gasoline or any other suitable combustive fluid.

In accordance with an exemplary embodiment of the invention, and with reference to FIG. 1, a dosing control system 200 for a portion of an exhaust system 100 of a vehicle 300 is depicted. The exhaust system 100 includes an exhaust flow port 102 configured and disposed to receive exhaust flow 104 from an internal combustion engine 106 or exhaust manifold thereof, and an SCR apparatus 108 disposed in downstream flow communication with the exhaust flow port 102. A downstream exhaust flow port 110, which may be in the form of an exhaust pipe or tailpipe, serves to deliver the downstream exhaust flow 112 to ambient. The dosing control system 200 includes a reductant tank 202 operable to contain a reductant solution 204 containing urea. As mentioned above, an example reductant solution 204 is an aqueous urea solution optimally blended with 32.5% urea and 67.5% deionized water. The reductant solution 204 is used in the SCR apparatus 108 to lower the concentration of NOx in the exhaust emissions of the engine 106. The dosing control system 200 further includes an injector 206, an upstream NOx sensor 220, a downstream NOx sensor 224, and a control module 210. The injector 206 is disposed in operable communication between the reductant tank 202 and the SCR apparatus 108 via a flow port 212. The injector 206 is operable to receive the reductant solution 204 from the reductant tank 202 via the flow port 212, and inject the reductant solution 204 into the exhaust flow port 102 upstream of the SCR apparatus 108.

The NOx sensors 220, 224 are configured to monitor a level of NOx emission in the exhaust flow in the respective upstream and downstream exhaust flow ports 102, 110. The NOx sensors 220, 224 communicate the level of upstream and downstream NOx emission to the control module 210 via signal lines 222, 226, respectively, and from such information the control module 210, via the processing circuit 218 or other suitable means, determines a level of NOx conversion efficiency. The control module 210 is in operable communication with the injector 206 via control line 216. The control module 210 is operable to adjust a dosing of the reductant solution 204 injected by the injector 206 based on the level of NOx conversion efficiency, which is dependent on the amount of ammonia stored in the catalyst of the SCR apparatus 108. The amount of stored ammonia is dependent on the aging of the catalyst of the SCR apparatus 108 and the quality of the reductant solution 204 injected into the exhaust flow upstream of the SCR apparatus 108. As the catalyst of the SCR apparatus ages, the ammonia storage capacity of the catalyst of the SCR apparatus 108 decreases, which would result in increased NOx emissions and ammonia slip if no adjustment was made to the dosing of the reductant solution 204 injected into the exhaust flow port 102.

If the NOx conversion efficiency is determined by the controller 210 to be within an acceptable range, such as equal to or greater than 70% for example, then the control module 210 will make no adjustment to the dosing of the reductant solution 204, as such an in-range efficiency level is considered by the control module 210 to be indicative of the catalyst of the SCR apparatus 108 not having aged. If the NOx conversion efficiency is determined by the controller 210 to be outside the acceptable range, such as but not limited to less than 70% for example, then the control module 210 will make a downward adjustment to the dosing of the reductant solution 204, as such an out-off-range efficiency level is considered by the control module 210 to be indicative of the catalyst of the SCR apparatus 108 having aged.

In an embodiment, the control module 210 may execute a second and third downward adjustment to the dosing of the reductant solution 204 if the NOx conversion efficiency is determined to fall below other defined levels, such as but not limited to less than 50% and less than 30%, respectively, for example. Under a condition of severe degradation of the SCR apparatus 108, which may be accompanied by no ammonia storage being present, the controller 210 would command no injection of the reductant solution 204.

This downward adjustment from a nominal dosing to a modified dosing directly addresses a decrease in the ammonia storage capacity of the catalyst of the SCR apparatus 108 that results from aging of the catalyst. As used herein, the term nominal dosing applies to a dosing that is based on feedback from the NOx sensors 220, 224 absent catalyst aging, and the term modified dosing applies to a dosing adjustment that is based on feedback from the NOx sensors 220, 224 indicative of catalyst aging. In an embodiment, the processing circuit 218 is responsive to executable instructions to adjust the dosing of the reductant solution 204 from the nominal dosing to the modified dosing by utilizing a look up table, a mathematical function, a multiplier, or any other means for changing a nominal value into a modified value suitable for a purpose disclosed herein.

In an embodiment the control module 210 includes a processing circuit 218 responsive to executable instructions which when executed by the processing circuit 218 facilitates a downward adjustment of the dosing of the reductant solution 204 in response to signals from the NOx sensors 220, 224 being interpreted by the controller 210 as being indicative of an aging catalyst in the SCR apparatus 108.

When the control module 210 is operational, such as during operation of the vehicle 300 for example, an embodiment includes the control module 210 being configured to facilitate a passive control process for decreasing the dosing of the reductant solution 204 in response to feedback signals from NOx sensors 220, 224 to the controller 210 being indicative of catalyst aging in the SCR apparatus 108. In the passive control process, the controller 210 is configured to execute a diagnostic test of the conversion efficiency of the SCR apparatus 108 after a defined period of time, such as but not limited to 15 minutes for example, that the vehicle 300 has been running, and to decrease the dosing rate of the reductant solution 204 by a defined amount, such as but not limited to 10% for example, if the NOx conversion efficiency is determined by the controller 210 to be outside the aforementioned acceptable range, which would be indicative of catalyst aging. If no catalyst aging is determined by the controller 210, then no adjustment to the dosing rate of the reductant solution 204 would be made. Under the passive control process, the controller 210 would maintain the level of dosing determined by the diagnostic test for the then-existing ignition cycle, and would save this level of dosing for use in the next ignition cycle, at which time another diagnostic test, and adjustment procedure if necessary, would be executed upon expiration of the aforementioned defined period of time, 15 minutes for example. In an embodiment and during the then-existing ignition cycle, no additional diagnostic test would be run, however, in another embodiment an additional diagnostic test may be run at a defined interval of time where the engine 106 has been constantly running, such as once an hour for example. As used herein, an ignition cycle is considered to be an operating time of the engine 106 of the vehicle 300 between sequential on and off states of the vehicle's ignition.

Another embodiment includes the control module 210 being configured to facilitate an intrusive control process for decreasing the dosing of the reductant solution 204 in response to feedback signals from NOx sensors 220, 224 to the controller 210 being indicative of catalyst aging in the SCR apparatus 108. In the intrusive control process, the controller 210 is configured to execute a diagnostic test of the conversion efficiency of the SCR apparatus 108 after a defined period of time, such as but not limited to 15 minutes for example, that the vehicle 300 has been running, and to decrease the dosing rate of the reductant solution 204 by a defined amount, such as but not limited to 10% for example, if the NOx conversion efficiency is determined by the controller 210 to be outside the aforementioned acceptable range, which would be indicative of catalyst aging. If no catalyst aging is determined by the controller 210, then no adjustment to the dosing rate of the reductant solution 204 would be made. Under the intrusive control process, the controller 210 would maintain the level of dosing determined by the diagnostic test for the then-existing ignition cycle, would save this level of dosing for use in the next ignition cycle, but would resort back to the original dosing level when another diagnostic test, and adjustment procedure if necessary, is executed at the next ignition cycle and upon expiration of the aforementioned defined period of time, 15 minutes for example. In an embodiment and during the then-existing ignition cycle, no additional diagnostic test would be run, however, in another embodiment an additional diagnostic test may be run at a defined interval of time where the engine 106 has been constantly running, such as once an hour for example.

Figure 2:
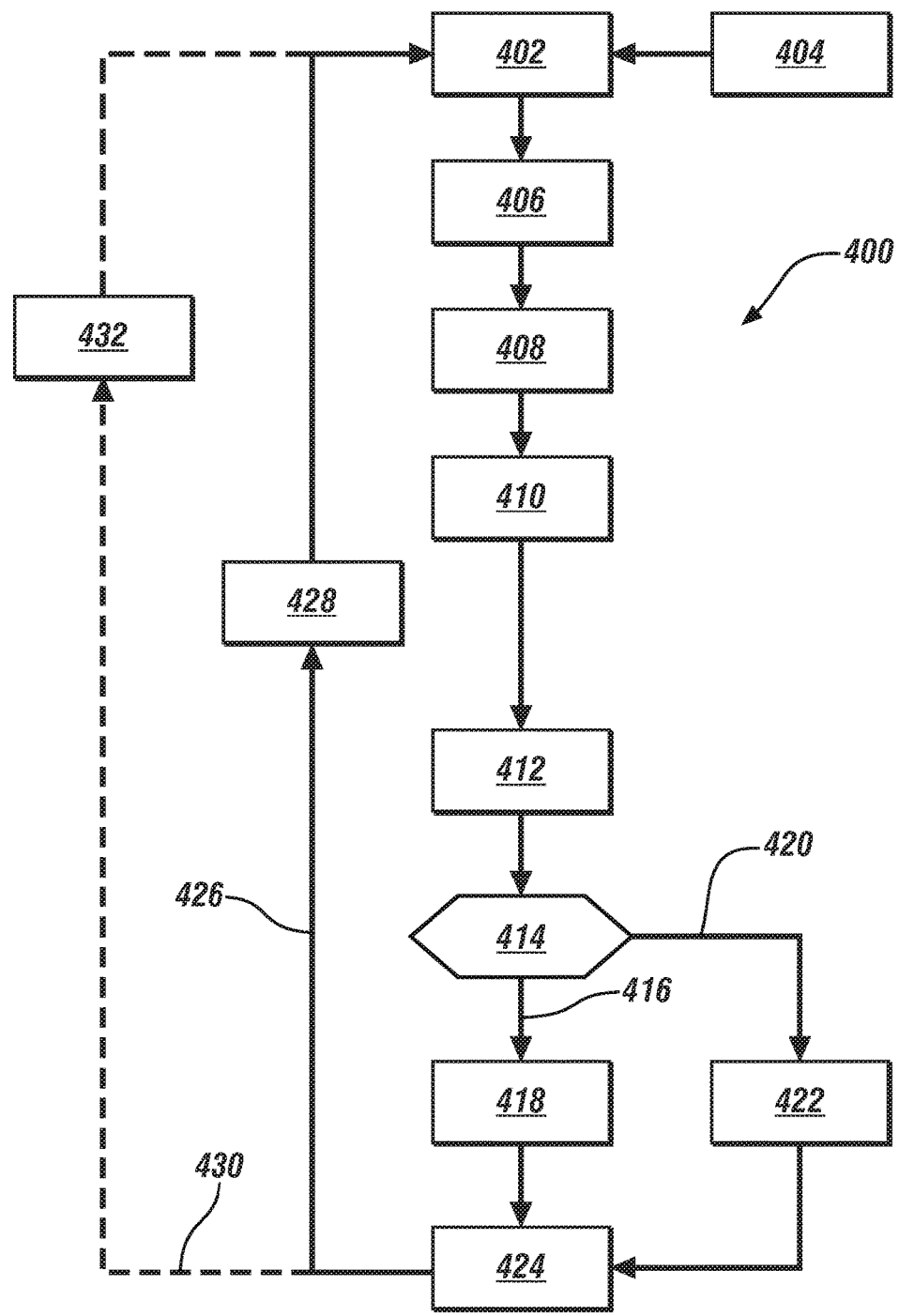
FIG. 2 depicts a flowchart of a method of dosing and delivering an exhaust fluid reductant solution in accordance with an embodiment of the invention.

In view of the foregoing description, it will be appreciated that an embodiment of the invention also includes a method 400, performed via executable instructions executed by processing circuit 218 for example, for delivering a reductant solution 204 to an exhaust flow 104 upstream of a SCR apparatus 108 disposed in flow communication with an internal combustion engine 106, which will now be discussed with reference to FIG. 2 in combination with FIG. 1.

In an embodiment, method 400 is a closed loop process that begins at logic block 402 where an ignition cycle is initiated and where a memory 228 is set via logic block 404 with an original dosing level for the reductant solution 204.

At logic block 406, a diagnostic test is executed to determine the conversion efficiency of the SCR apparatus 108 after a defined period of time, such as 15 minutes for example, that the engine 106 has been running. In an embodiment, the diagnostic test is run once an ignition cycle; however, in another embodiment it may be run at a defined interval of time where the engine 106 has been constantly running, such as once an hour for example.

At logic block 408, a first level of NOx emissions in the exhaust flow upstream of the SCR apparatus 108 is sensed via NOx sensor 220.

At logic block 410, a second level of NOx emissions in the exhaust flow downstream of the SCR apparatus 108 is sensed via NOx sensor 224. The sensing at logic blocks 408 and 410 may occur simultaneously or at different times.

At logic block 412, processing circuit 218 determines a NOx conversion efficiency of the SCR apparatus 108 based on the sensed first and second levels of NOx emissions from logic blocks 408, 410.

At logic block 414, if it is determined from logic block 412 that the NOx conversion efficiency of the SCR apparatus 108 has decreased below a defined level of conversion efficiency, such as but not limited to 70% for example, then control logic passes via logic path 416 to logic block 418, otherwise control logic passes via logic path 420 to logic block 422, which will now be described separately.

At logic block 418, where it has been determined that the NOx conversion efficiency of the SCR apparatus 108 has decreased below the defined level of conversion efficiency, the level of dosing of the reductant solution 204 to be injected into the exhaust flow upstream of the SCR apparatus 108 is decreased by a defined amount, such as but not limited to 10% for example.

At logic block 422, where it has been determined that the NOx conversion efficiency of the SCR apparatus 108 has not decreased below the defined level of conversion efficiency, the level of dosing of the reductant solution 204 to be injected into the exhaust flow upstream of the SCR apparatus 108 is not decreased, but instead is maintained at the prior-established dosing level. The prior-established dosing level may be the original dosing level set at logic block 404, or may be a previously decreased dosing level set at logic block 418 from a prior diagnostic test.

From either logic block 418 or logic block 422, control logic passes to logic block 424 where the defined level of dosing of the reductant solution 204, which was previously defined via logic block 418 or logic block 422, is injected into the exhaust flow upstream of the SCR apparatus 108.

From logic block 424, control logic passes back to logic block 402, where the initiation of a new ignition cycle commences, via one of two separate logic paths depending on the settings of the controller 210, the first logic path 426 following a passive control process, and the second logic path 430 following an intrusive control process, which will now be described separately.

In the passive control process, control logic passes via logic path 426 to logic block 428, where the defined level of dosing from logic block 424 is maintained for the existing ignition cycle, and where a decreased level of dosing, if such has occurred at logic block 418, is saved to memory 228 for use in the next ignition cycle of the engine 106.

In the intrusive control process, control logic passes via logic path 430 to logic block 432, where the defined level of dosing from logic block 424 is maintained for the existing ignition cycle, but where the decreased level of dosing, if such has occurred at logic block 418, is not saved to memory 228, but instead the level of dosing of the reductant solution 204 to be used for the next ignition cycle of the engine 106 is resorted back to the original level of dosing established at logic block 404.

From either logic block 428 or 432, control logic passes back to logic block 402 where the method 400 is reset for a new ignition cycle.

While an embodiment is disclosed and illustrated herein using two NOx sensors 220, 224, one downstream (sensor 220) of the SCR apparatus 108 and one upstream (sensor 224) of the SCR apparatus 108 for control and diagnosis of the SCR apparatus 108, it will be appreciated that the scope of the invention is not so limited, and that other control scenarios may be used for NOx analysis in lieu of the two sensors 220, 224. For example, the inlet NOx concentration to the SCR apparatus 108 (upstream of the SCR apparatus 108) may be measured directly with NOx sensor 220, or may be predicted or modeled based on inputs from various engine sensors and/or actuators, and combustion parameters. Example combustion parameters would include, but are not limited to, both EGR (exhaust gas recirculation) and air flow, in addition to injection system parameters. Example injection system parameters would include, but are not limited to, the timing and quantity of each injection, injection pressure, and/or rail pressure. Depending on the complexity of the engine control strategy, a map based approach could be used to predict the engine out NOx, where the engine would be run at each speed and torque according to a map for each combustion mode, with the inlet NOx concentration being measured at each point in the map. Accordingly, the information provided by the NOx sensor (sensor 224) upstream of the SCR apparatus 108 can herein be more generally interpreted as an engine-out NOx concentration value, which is either sensed directly or modeled.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A dosing control system for an exhaust system, the exhaust system having an exhaust flow port configured and disposed to receive exhaust flow from an internal combustion engine, and a selective catalytic reduction (SCR) apparatus disposed in downstream flow communication with the exhaust flow port, the dosing control system comprising:
    a reductant tank operable to contain a reductant solution comprising urea;
    an injector disposed in operable communication between the reductant tank and the SCR apparatus, and being operable to inject the reductant solution into an exhaust flow upstream of the SCR apparatus;
    a first NOx sensor disposed to sense NOx emissions in the exhaust flow upstream of the SCR apparatus;
    a second NOx sensor disposed to sense NOx emissions in the exhaust flow downstream of the SCR apparatus; and
    a control module disposed and configured to be in signal communication with the first and second NOx sensors and to be in operable communication with the injector, the control module comprising a processing circuit responsive to executable instructions which when executed by the processing circuit is operable to set an original dosing level and decrease a dosing of the reductant solution injected by the injector based on a determination from signals received from the first and second NOx sensors that a reduction in a conversion efficiency of the SCR apparatus below a defined level of conversion efficiency has occurred;
    wherein the processing circuit of the control module is responsive to executable instructions which when executed by the processing circuit is configured to facilitate one of:
    a passive control process for decreasing the dosing of the reductant solution by a defined amount in response to signals from the first and second NOx sensors being indicative of the conversion efficiency of the SCR apparatus having fallen below a defined level of conversion efficiency, wherein in the passive control process the controller is configured to: execute a diagnostic test of the conversion efficiency of the SCR apparatus after a defined period of time that the engine has been running; decrease the dosing of the reductant solution by a defined amount if the conversion efficiency of the SCR apparatus is determined by the control module to be below a defined level of conversion efficiency; maintain the decreased dosing level for an existing ignition cycle of the engine; and, save to a memory the decreased dosing level for use in a next ignition cycle of the engine;
    or;
    an intrusive control process for decreasing the dosing of the reductant solution by a defined amount in response to signals from the first and second NOx sensors being indicative of the conversion efficiency of the SCR apparatus having fallen below a defined level of conversion efficiency, wherein in the intrusive control process, the processing circuit of the control module is responsive to executable instructions which when executed by the processing circuit is configured to: execute a diagnostic test of the conversion efficiency of the SCR apparatus after a defined period of time that the engine has been running; decrease the dosing of the reductant solution by a defined amount if the conversion efficiency of the SCR apparatus is determined by the control module to be below a defined level of conversion efficiency; maintain the decreased dosing level for an existing ignition cycle of the engine; save to a memory the decreased dosing level for use in a next ignition cycle of the engine; and, resort back to the original dosing level for use in a next diagnostic test.

2. The dosing control system of claim 1, wherein:
    the control module comprises a processing circuit responsive to executable instructions which when executed by the processing circuit facilitates a downward adjustment of the dosing of the reductant solution in response to signals from the first and second NOx sensors being indicative of the reduction in the conversion efficiency of the SCR apparatus.

3. The dosing control system of claim 2, wherein the processing circuit is further responsive to executable instructions to decrease the dosing of the reductant solution according to at least one of: a look up table; a mathematical function; or, a multiplier.

4. The dosing control system of claim 2, wherein the processing circuit is further responsive to executable instructions to downwardly adjust the dosing of the reductant solution in response to the conversion efficiency of the SCR apparatus falling below a defined level of conversion efficiency.

5. The dosing control system of claim 4, wherein the defined level of conversion efficiency is 70%.

6. The dosing control system of claim 1, wherein:
    the processing circuit is configured to facilitate only one of: the passive control process; or, the intrusive control process.

7. The dosing control system of claim 1, wherein:
    in response to the processing circuit being configured to facilitate either of the passive control process or the intrusive control process, the defined level of conversion efficiency is 70%, the defined period of time is 15 minutes, and the defined amount is 10%.

8. A method for delivering an exhaust fluid reductant solution to an exhaust flow upstream of a selective catalytic reduction (SCR) apparatus disposed in flow communication with an internal combustion engine, the method comprising:
    determining a NOx conversion efficiency of the SCR apparatus;
    based on the NOx conversion efficiency being determined to have decreased below a defined level of conversion efficiency, decreasing by a defined amount the dosing of the reductant solution to be injected into the exhaust flow upstream of the SCR apparatus; and injecting the decreased dosing of the reductant solution into the exhaust flow upstream of the SCR apparatus;

executing a diagnostic test of the conversion efficiency of the SCR apparatus after a defined period of time that the engine has been running;

decreasing the dosing of the reductant solution by a defined amount if the conversion efficiency of the SCR apparatus is determined by the diagnostic test to be below a defined level of conversion efficiency;

maintaining the decreased dosing level for an existing ignition cycle of the engine; and either saving to a memory the decreased level of dosing for use in a next ignition cycle of the engine, or resorting back to the original level of dosing for use in a next ignition cycle of the engine.

9. The method of claim 8, wherein the determining a NOx conversion efficiency of the SCR apparatus comprises:

sensing a first level of NOx emissions in the exhaust flow upstream of the SCR apparatus;

sensing a second level of NOx emissions in the exhaust flow downstream of the SCR apparatus; and via a processing circuit, determining from the sensed first and second levels of NOx emissions a NOx conversion efficiency of the SCR apparatus.

10. The method of claim 8, wherein:

the defined level of conversion efficiency is 70%, the defined period of time is 15 minutes, and the defined amount is 10%.

11. The method of claim 8, wherein the decreasing by a defined amount the dosing of the reductant solution to be injected into the exhaust flow upstream of the SCR apparatus comprises adjusting the dosing of the reductant solution according to at least one of: a look up table; a mathematical function; or, a multiplier.

12. The method of claim 8, wherein:

the step of either saving to a memory the decreased level of dosing for use in a next ignition cycle of the engine, or resorting back to the original level of dosing for use in a next ignition cycle of the engine, comprises only one of: saving to a memory the decreased level of dosing for use in a next ignition cycle of the engine; or, resorting back to the original level of dosing for use in a next ignition cycle of the engine.

13. A vehicle, comprising:

an internal combustion engine;

an exhaust system comprising an exhaust flow port configured and disposed to receive exhaust flow from the engine, and a selective catalytic reduction (SCR) apparatus disposed in downstream flow communication with the exhaust flow port; and a dosing control system comprising:

a reductant tank operable to contain a reductant solution comprising urea;

an injector disposed in operable communication between the reductant tank and the SCR apparatus, and being operable to inject the reductant solution into an exhaust flow upstream of the SCR apparatus;

a first NOx sensor disposed to sense NOx emissions in the exhaust flow upstream of the SCR apparatus;

a second NOx sensor disposed to sense NOx emissions in the exhaust flow downstream of the SCR apparatus; and a control module disposed and configured to be in signal communication with the first and second NOx sensors and to be in operable communication with the injector, the control module comprising a processing circuit responsive to executable instructions which when executed by the processing circuit is operable to decrease a dosing of the reductant solution injected by the injector based on a determination from signals received from the first and second NOx sensors that a reduction in a conversion efficiency of the SCR apparatus below a defined level of conversion efficiency has occurred;

wherein the processing circuit of the control module is responsive to executable instructions which when executed by the processing circuit is configured to facilitate one of:

a passive control process for decreasing the dosing of the reductant solution by a defined amount in response to signals from the first and second NOx sensors being indicative of the conversion efficiency of the SCR apparatus having fallen below a defined level of conversion efficiency, wherein in the passive control process the controller is configured to: execute a diagnostic test of the conversion efficiency of the SCR apparatus after a defined period of time that the engine has been running; decrease the dosing of the reductant solution by a defined amount if the conversion efficiency of the SCR apparatus is determined by the control module to be below a defined level of conversion efficiency; maintain the decreased dosing level for an existing ignition cycle of the engine; and, save to a memory the decreased dosing level for use in a next ignition cycle of the engine;

or;

an intrusive control process for decreasing the dosing of the reductant solution by a defined amount in response to signals from the first and second NOx sensors being indicative of the conversion efficiency of the SCR apparatus having fallen below a defined level of conversion efficiency, wherein in the intrusive control process, the processing circuit of the control module is responsive to executable instructions which when executed by the processing circuit is configured to: execute a diagnostic test of the conversion efficiency of the SCR apparatus after a defined period of time that the engine has been running; decrease the dosing of the reductant solution by a defined amount if the conversion efficiency of the SCR apparatus is determined by the control module to be below a defined level of conversion efficiency; maintain the decreased dosing level for an existing ignition cycle of the engine; save to a memory the decreased dosing level for use in a next ignition cycle of the engine; and, resort back to the original dosing level for use in a next diagnostic test.

14. The vehicle of claim 13, wherein:

the processing circuit is configured to facilitate only one of: the passive control process; or, the intrusive control process.

* * * * *